Figure 1:
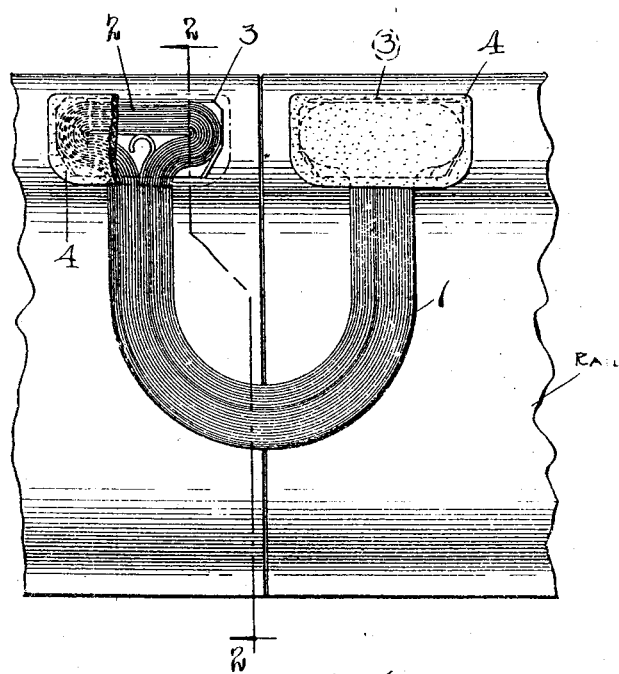

A. B. HERRICK.
RAIL BOND.
APPLICATION FILED APR. 29, 1915.

1,170,751.

Patented Feb. 8, 1916.

WITNESSES
O. M. Kappler
Mary Gladwell

INVENTOR
Albert B. Herrick
BY Fay, Oberlin & Fay
ATTORNEYS

UNITED STATES PATENT OFFICE.

ALBERT B. HERRICK, OF NEW YORK, N. Y., ASSIGNOR TO THE ELECTRIC RAILWAY IMPROVEMENT COMPANY, OF CLEVELAND, OHIO, A CORPORATION OF OHIO.

RAIL-BOND.

1,170,751. Specification of Letters Patent. Patented Feb. 8, 1916.

Original application filed November 29, 1912, Serial No. 733,974. Divided and this application filed April 29, 1915. Serial No. 24,708.

*To all whom it may concern:*

Be it known that I, ALBERT B. HERRICK, a citizen of the United States, and a resident of New York, county of New York, and State of New York, have invented a new and useful Improvement in Rail-Bonds, of which the following is a specification, the principle of the invention being herein explained and the best mode in which I have contemplated applying that principle, so as to distinguish it from other inventions.

The present improved construction of rail bond is shown and described in my co-pending application for a method of and electrode for welding bonds to rails, filed November 29, 1912, Serial No. 733,974, the claims to such bond having been required to be divided out of such co-pending application.

As stated in the application in question, in the improved process there disclosed and claimed, I utilize a recessed electrode adapted to inclose the bond terminal, but shallower than the latter so that initially said electrode will not be adapted to contact with the rail face but only be brought thus in contact with the latter after the bond terminal has been brought substantially to a state of fusion, in which state it will be compressed, or "squashed," sufficiently to allow the electrode, under the continuing pressure which is applied thereto, to contact with the rail at points laterally contiguous to said bond terminal.

Instead of a separate electrode adapted to be brought up to the bond terminal and having a recess adapted to receive such terminal in the fashion just described, I may utilize a high resistance medium, molded, or otherwise more or less permanently attached to the terminal, as described in U. S. Letters Patent No. 987,136, granted to me March 21, 1911. The material, however, thus attached to the bond head, or terminal, will not extend around its edges, so as to lie flush with the contact head of said face, as in such patent, but will stop a trifle short thereof.

In utilizing a bond constructed as just described, the contacting of such material, or attached electrode, with the rail is not relied on necessarily to additionally heat the rail face at the points adjacent to the terminal where such contact occurs; but such contact rather marks the conclusion of the welding operation, the current used being of such character that when this additional contact is thus afforded, the heat applied to the bond terminal will be decreased by the diversion of the current and the terminal allowed to set, so that any clamping apparatus, and for that matter the electrode itself, may be presently removed following the welding or brazing operation. In other words, the contact of the electrode with the face of the rail cannot take place until the projecting bond head has become plastic, or flowing, in the recess in such electrode, and a homogeneous weld made with the rail head or other surface with which the bond terminal is to be united, and as soon as this state has been reached the heating action of the electrode is automatically reduced.

The detailed construction of my improved rail bond will now be fully described and specifically set forth in the claims which follow.

Figure 2:
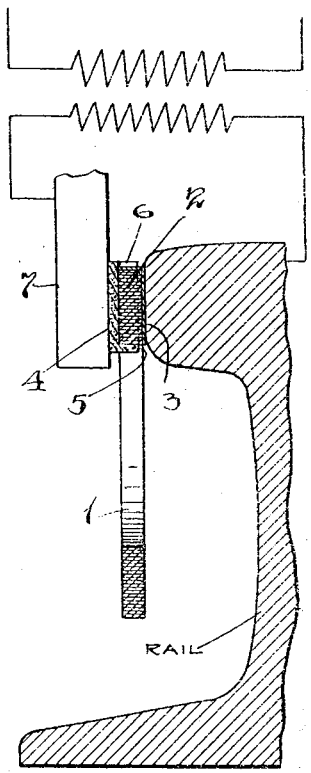
Figure 3:
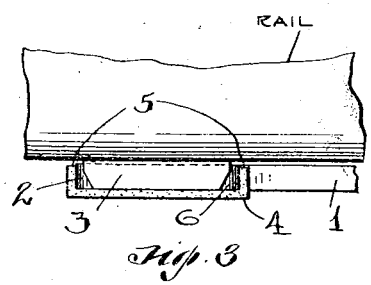
Figure 4:
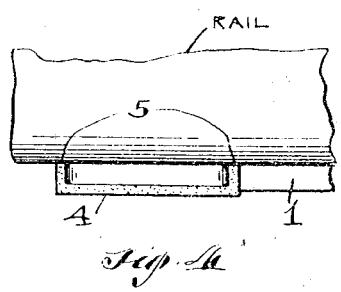

In said annexed drawing: Figure 1 is a side elevation of two abutting rail ends, showing my improved form of rail bond with attached or molded electrode; Fig. 2 is a vertical section of such bond and rail with other appurtenant parts, said parts being more or less diametrically shown; Fig. 3 is a plan view of such bond and rail showing the former as it appears when first applied to the latter; and Fig. 4 is a view similar to Fig. 3, but showing the bond in its final attached condition.

The form of bond 1 shown in connection with the foregoing figures is intended to be merely typical, being composed of laminated strands and having a general U-shape. Said bond is furthermore shown as having its head or terminal 2 provided with a sheet 3 of hard solder, brass or like material on the face which is designed to contact with the rail. This, however, is optional so far as the novel features of the present invention are concerned.

The heating electrode 4 for producing the necessary temperature in the bond terminal and contacting face of the rail, as already indicated, is designed to be more or less permanently attached to such terminal. In the preferred construction of the same illustrated, such electrode may be formed by mixing carbon in suitable form together with a suitable binding material or materials, applying the same in plastic condition to the bond terminal, and then molding them to inclose said terminal in the fashion clearly shown in the figures of the drawing. After baking or otherwise hardening the applied mass, a matrix is formed, the edges 5 of which stop short of the inner face of the bond terminal, and the upper portion 6 of which is open.

In utilizing the foregoing construction of bond with attached electrode, a separate movable electrode or contact member 7, either of metal, or preferably high resistance material is brought to bear against the outer face of the matrix 4 and a suitable electric current passed through the same, the interposed bond terminal and the rail, as indicated in Fig. 2. The initial effect of such electric current, (neglecting the interposed strip 3) is to cause the electrode matrix to be highly heated. Such heat is in turn transmitted by conduction through the bond and strip, to the contacting face of the rail, so that by the time the bond terminal is fused, such rail face becomes heated to a sufficient extent to form a homogeneous union or weld with the metal of the terminal, which will usually be copper. Immediately, however, the bond terminal becomes sufficiently hot to become soft or plastic, it will, under the pressure of the electrode, spread or be squeezed out enough to allow the inner edges 5 of the electrode to come in contact with the rail face, as shown in Fig. 4. The diversion of current thus produced will permit the lowering of the general temperature of the electrode and this can be regulated by a suitable proportioning of the area of the edges of such electrode thus brought into contact with the rail, so that such terminal may actually begin at once to harden. It will, however, obviously be molded to the shape of the recess in the electrode, and cannot by any possibility be flattened or pressed out to a degree which would render the electric connection through the bond inadequate or less than might be expected from its normal cross-section.

The shape of the bond-head-containing recess in the electrode may be a compromise between the head of the bond and the shape of the rail head or surface to which the bond is to be welded. Furthermore, if there is not enough metal provided by the fused bond head to properly fill the container formed by the recess between the electrode and the rail, more such metal can be supplied through the opening 6 in the upper edge of the electrode or if an excess of metal occurs, this may be expelled through the same opening. The shape of the container, furthermore, can be made such that the relation of the welded head and the surface to which it is joined, will give the maximum conductivity through the welded junction.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. As an article of manufacture, the combination with an article to be welded, of an electrode comprising a body of high resistance material provided with a recess substantially conforming in shape with said article but shallower, whereby such article will project beyond the face of the electrode.

2. As an article of manufacture, the combination with an article to be welded, of an electrode comprising a body of high resistance material provided with a recess substantially conforming in shape with said article but shallower, whereby such article will project beyond the face of the electrode, said electrode body having an opening extending from the upper side to such recess.

3. As an article of manufacture, the combination with a rail bond, of an electrode comprising a body of high resistance material provided with a recess substantially conforming in shape with the terminal of said bond but shallower, whereby such bond terminal will project beyond the face of the electrode.

4. As an article of manufacture, the combination with a rail bond, of a body of high resistance material applied to the terminal of said bond, such body inclosing the outer face of the bond terminal and the edges thereof save for the portion of such edges adjacent the inner face of the terminal.

5. As an article of manufacture, the combination with a rail bond, of an electrode comprising a body of high resistance material provided with a recess substantially conforming in shape with the terminal of said bond but shallower, whereby such bond terminal will project beyond the face of the electrode, said electrode body having an opening extending from the upper side to such recess.

6. As an article of manufacture, an electrode adapted to be applied to and carried by the article to be welded, said electrode comprising a body of high resistance material provided with a recess substantially conforming in shape with said article but shallower, whereby such article will project beyond the face of the electrode.

7. As an article of manufacture, an electrode adapted to be applied to and carried by the article to be welded, said electrode comprising a body of high resistance material provided with a recess substantially conforming in shape with said article but shallower, whereby such article will project beyond the face of the electrode, said electrode body having an opening extending from the upper side to such recess.

8. As an article of manufacture, an electrode for use in homogeneously uniting a bond to a rail, said electrode comprising a body of high resistance material provided with a recess substantially conforming in shape with the terminal of said bond but shallower, whereby such bond terminal will project beyond the face of the electrode.

9. As an article of manufacture, an electrode for use in homogeneously uniting a bond to a rail, said electrode comprising a body of high resistance material adapted to be applied to the terminal of said bond, such body inclosing the outer face of the bond terminal and the edges thereof save for the portion of such edges adjacent the inner face of the terminal.

10. As an article of manufacture, an electrode for use in homogeneously uniting a bond to a rail, said electrode comprising a recessed body of high resistance material adapted to initially fit partially over a bond terminal, the recess in said body being of the ultimate shape of such terminal.

Signed by me, this 27th day of April 1915.

ALBERT B. HERRICK.

Attested by—
D. T. DAVIES,
H. B. FAY.